(12) United States Patent
Chang

(10) Patent No.: US 9,052,060 B1
(45) Date of Patent: Jun. 9, 2015

(54) TRIPOD WITH STORAGE STRUCTURE

(71) Applicant: Kupo Co., LTD, New Taipei (TW)

(72) Inventor: Hung-Yueh Chang, Taipei (TW)

(73) Assignee: Kupo Co., Ltd., New Taipei (TW)

( * ) Notice: Subject to any disclaimer, the term of this patent is extended or adjusted under 35 U.S.C. 154(b) by 0 days.

(21) Appl. No.: 14/287,700

(22) Filed: May 27, 2014

(51) Int. Cl.
  *F16M 11/38* (2006.01)
  *F16M 11/24* (2006.01)
  *F16M 11/16* (2006.01)

(52) U.S. Cl.
  CPC .............. *F16M 11/242* (2013.01); *F16M 11/16* (2013.01)

(58) Field of Classification Search
  CPC .............................. F16M 11/242; F16M 11/16
  USPC ........ 248/166, 170, 171, 187.1, 188.5, 188.6, 248/188.7
  See application file for complete search history.

(56) References Cited

U.S. PATENT DOCUMENTS

| 4,249,817 | A | * | 2/1981 | Blau | 396/428 |
| 5,267,712 | A | * | 12/1993 | Shen | 248/179.1 |
| 5,934,628 | A | * | 8/1999 | Bosnakovic | 248/177.1 |
| 8,915,476 | B2 | * | 12/2014 | Nakatani | 248/177.1 |

FOREIGN PATENT DOCUMENTS

DE           1102419 B6 *  3/1961

* cited by examiner

*Primary Examiner* — Gwendolyn W Baxter
(74) *Attorney, Agent, or Firm* — The Weintraub Group, P.L.C.

(57) ABSTRACT

A tripod has a mounting seat, a mounting assembly, and a base. The mounting seat has two engaging protrusions disposed next to each other, two engaging recesses disposed next to each other, and two engaging members resiliently mounted respectively in the engaging recesses. The mounting assembly has a retractable rod mounted through the mounting seat. The base is connected to a lower end of the retractable rod. When combining multiple tripods, the engaging protrusion of the mounting seat of one tripod is mounted into the engaging recess of the mounting seat of another tripod. Thus, the tripods can be arranged as a cuboid to reduce space that the tripods occupy for the convenience of storage.

8 Claims, 10 Drawing Sheets

TRIPOD WITH STORAGE STRUCTURE

BACKGROUND OF THE INVENTION

1. Field of the Invention

The present invention relates to a tripod for supporting a camera, especially to a tripod with a storage structure that facilitates storage and arrangement of the tripods.

2. Description of the Prior Art(s)

A tripod is suitable for mounting and supporting a small and medium-sized image capture device, such as a camera, a telescope, and the like, and the tripod has three rods pivotally connected to a mounting seat. With the three rods standing on a ground to form a three-point support, the image capture device can be stably mounted on the tripod and does not easily shake or be turned over. Moreover, the tripod may also have an adjustment mechanism for adjusting an elevation angle of the image capture device or to rotate the image capture device.

When storing a conventional tripod, three rods of the conventional tripod are folded or retracted to a smallest possible size. Then the folded or retracted tripod can be laid on the ground or against a wall. However, the above-mentioned way is applicable when only one single tripod is needed to be stored. As for a studio or a shop, far more than one tripod is provided in the studio or in the shop. Storing the conventional tripods in the above-mentioned way occupies too much space of the studio or the shop. Moreover, it is also inconvenient to move a pile of the conventional tripods.

To overcome the shortcomings, the present invention provides a tripod with a storage structure to mitigate or obviate the aforementioned problems.

SUMMARY OF THE INVENTION

The main objective of the present invention is to provide a tripod with a storage structure. The tripod has a mounting seat, a mounting assembly, and a base. The mounting seat has two engaging protrusions disposed next to each other, two engaging recesses disposed next to each other, two engaging members resiliently mounted respectively in the engaging recesses, and three support rods protruding down from a bottom surface of the mounting seat. The mounting assembly has a retractable rod mounted through the mounting seat. The base is connected to a lower end of the retractable rod and has three abutting protrusions and multiple adjusting panels. Two ends of each adjusting panel are respectively connected pivotally to a corresponding one of the support rods and a corresponding one of the abutting protrusions.

When combining multiple tripods, the engaging protrusion of the mounting seat of one tripod is mounted into the engaging recess of the mounting seat of another tripod. Thus, the tripods can be arranged as a cuboid to reduce space that the tripods occupy for the convenience of storage. Moreover, the tripods are stably connected to one another, so that the tripods do not topple when being bumped and can be moved easily.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
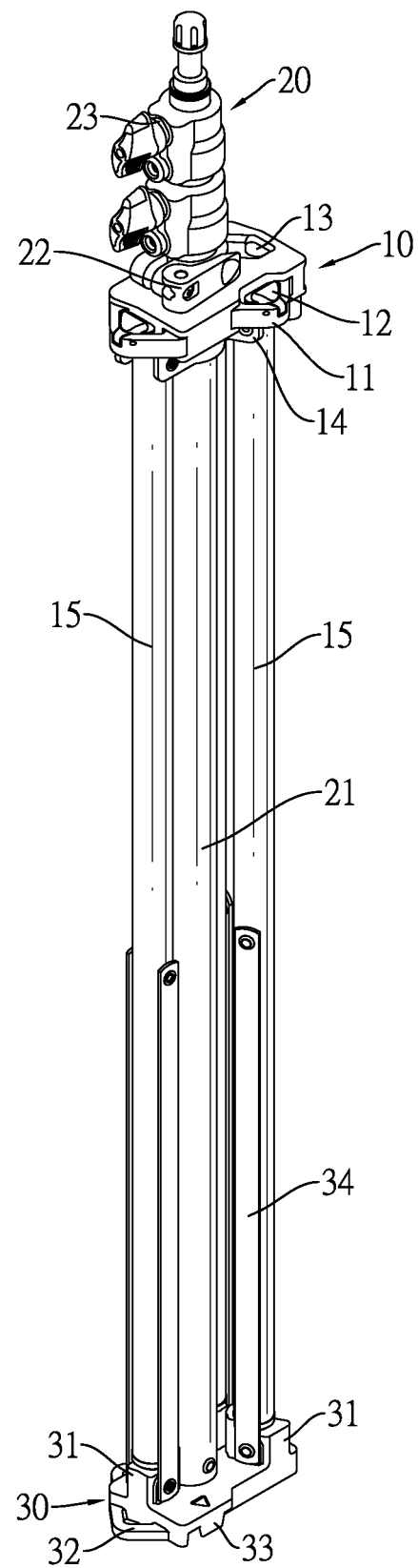
FIG. 1 is a perspective view of a tripod with a storage structure in accordance with the present invention.

With reference to FIG. 1, a tripod with a storage structure in accordance with the present invention comprises a mounting seat 10, a mounting assembly 20, and a base 30.

Figure 2:
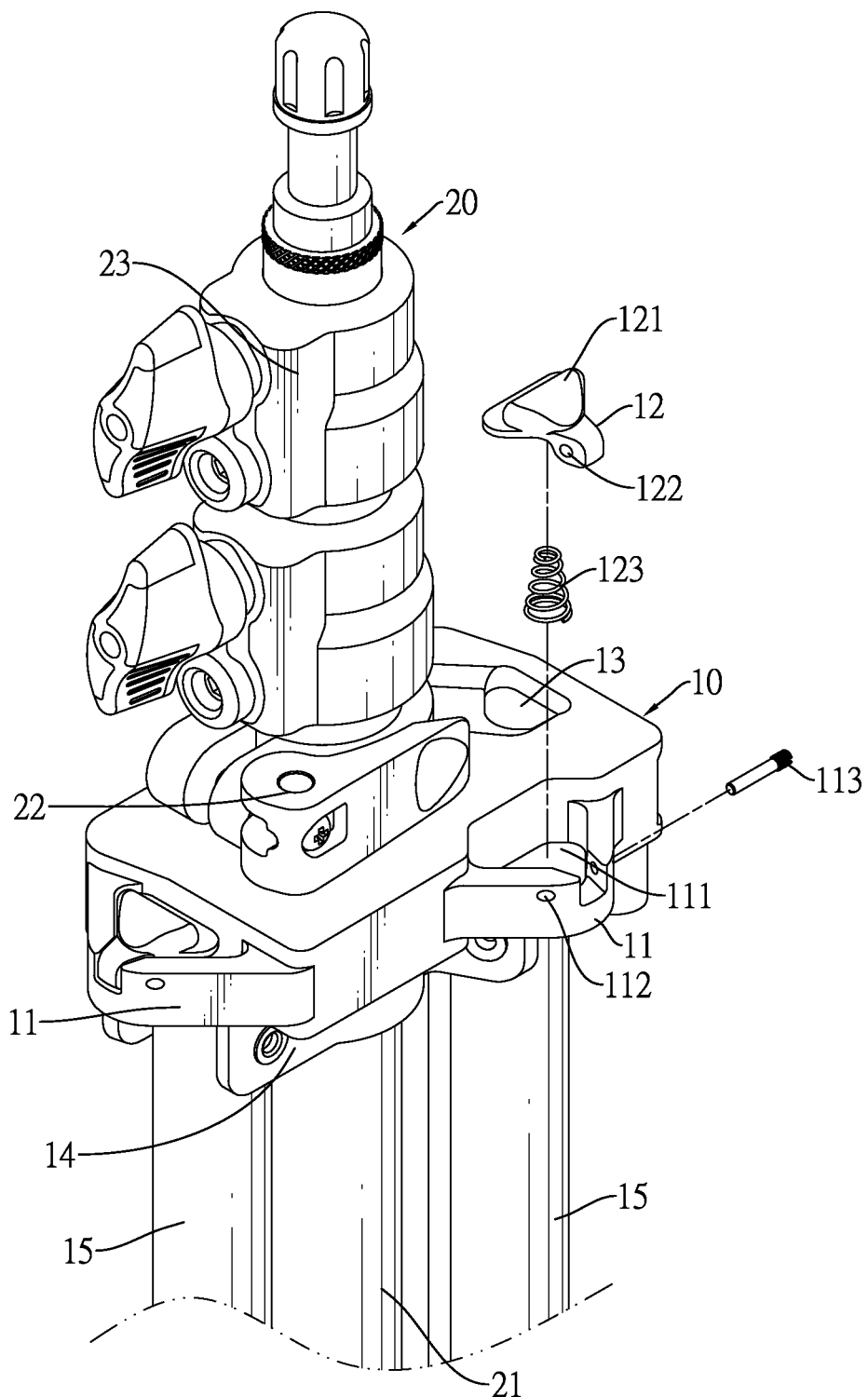
FIG. 2 is an enlarged perspective view of the tripod in FIG. 1.

With reference to FIGS. 1 and 2, the mounting seat 10 has four sidewalls, a top surface, a bottom surface, two engaging protrusions 11, two engaging recesses 13, two engaging members 12, two pivot rods 113, three pairs of connecting panels 14, and three support rods 15.

The four sidewalls of the mounting seat 10 include two shortened sidewalls and two elongated sidewalls. The shortened sidewalls of the mounting seat 10 are disposed opposite to each other. The elongated sidewalls of the mounting seat 10 are disposed opposite to each other.

The engaging protrusions 11 are respectively formed on two of the sidewalls of the mounting seat 10 and are disposed next to each other. Specifically, the engaging protrusions 11 are respectively formed on one of the shortened sidewalls of the mounting seat 10 and one of the elongated sidewalls of the mounting seat 10. Each engaging protrusion 11 has an upper surface, a receiving recess 111, two inner side surfaces, and two pivot holes 112. The receiving recess 111 is formed in the upper surface of the engaging protrusion 11. The inner side surfaces of the engaging protrusion 11 are defined in the receiving recess 111. The pivot holes 112 are respectively formed through the inner side surfaces of the engaging protrusion 11 and align with each other.

Figure 5:
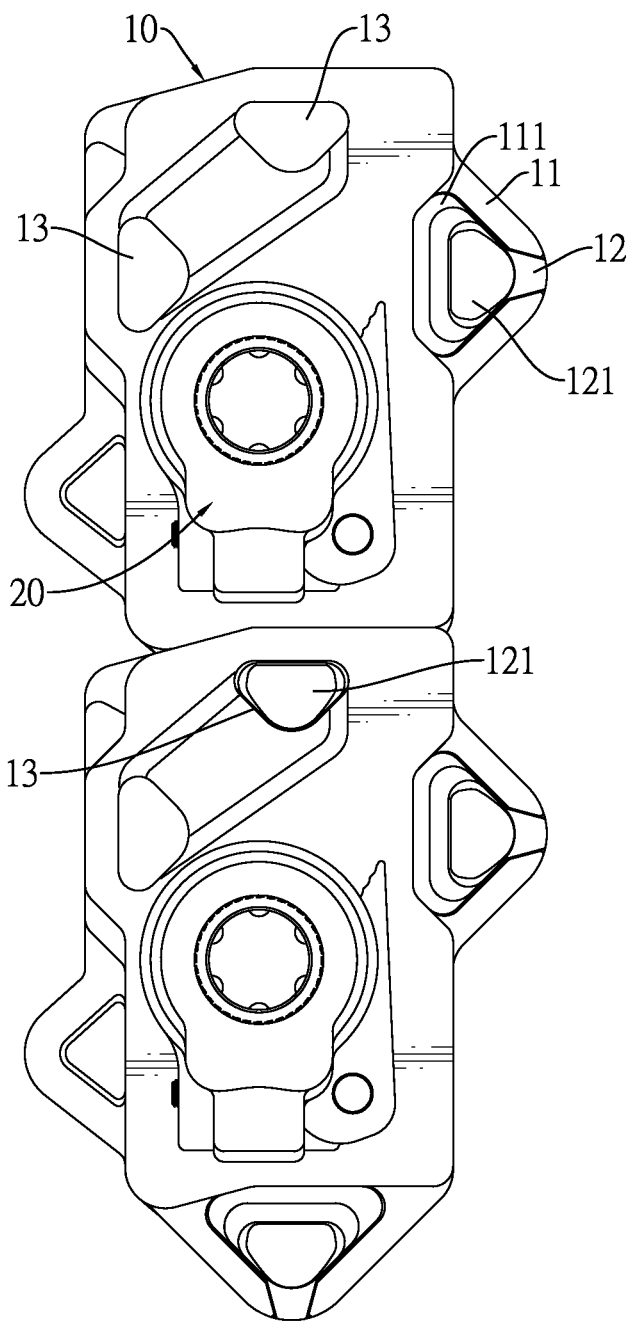
FIG. 5 is a first operational top view of the tripod in FIG. 1.

With further reference to FIG. 5, the engaging recesses 13 are respectively formed in the other two of the sidewalls of the mounting seat 10, are disposed next to each other, and are formed through the top surface of the mounting seat 10. Specifically, the engaging recesses 13 are respectively formed in the other shortened sidewall of the mounting seat 10 and the other elongated sidewall of the mounting seat 10.

The engaging members 12 are respectively mounted in the receiving recesses 111, are respectively connected pivotally to the engaging protrusions 11, and are resilient to pivot upward. Each engaging member 12 has a top, a bottom, a positioning protrusion 121, a through hole 122, and a resilient element 123. The positioning protrusion 121 is formed on the top of the engaging member 12. The through hole 122 is formed through the engaging member 12, and is mounted between and aligns with the pivot holes 112 of a corresponding one of the engaging protrusions 11. The resilient element 123 has two ends. The ends of the resilient element 123 respectively abut the bottom of the engaging member 12 and the corresponding engaging protrusion 11. The pivot rods 113 are respectively mounted through the pivot holes 112 and the through holes 122 that align with each other.

The three pairs of connecting panels 14 are separately formed on the bottom surface of the mounting seat 10. The three support rods 15 are respectively connected pivotally to the three pairs of the connecting panels 14. Each support rod 15 has a lower end and an upper end. The upper end of the support rod 15 is pivotally connected to the bottom surface of the mounting seat 10, and is mounted between and is pivotally connected to the connecting panels 14 of a corresponding pair.

The mounting assembly 20 is mounted on the mounting seat 10 and has a retractable rod 21, a clamp ring 22, and a support 23. The retractable rod 21 is mounted through the mounting seat 10, is capable of sliding up and down relative to the mounting seat 10, and has an upper end and a lower end. The upper end of the retractable rod 21 protrudes up from the top surface of the mounting seat 10. The lower end of the retractable rod 21 protrudes down below the bottom surface of the mounting seat 10. The clamp ring 22 is mounted around the retractable rod 21 and is mounted on the top surface of the mounting seat 10. The clamp ring 22 may be a quick-release assembly. The support 23 is mounted on the upper end of the retractable rod 21 and is used for mounting external devices, such as cameras.

Figure 3:
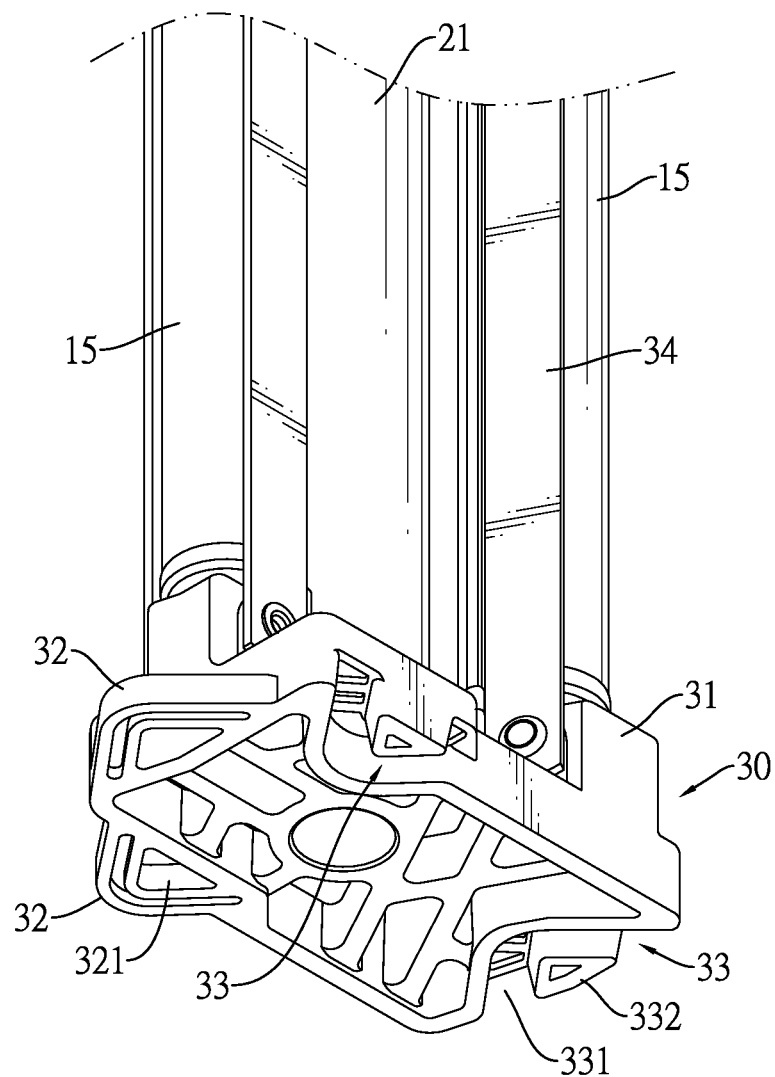
FIG. 3 is another enlarged perspective view of the tripod in FIG. 1.

With reference to FIGS. 1 and 3, the base 30 is connected to the lower end of the retractable rod 21 and has a top surface, a peripheral sidewall, three abutting protrusions 31, and multiple adjusting panels 34. The abutting protrusions 31 are separately formed on the top surface of the base 30, are disposed adjacent to the peripheral sidewall of the base 30, and respectively abut against the lower ends of the support rods 15. The adjusting panels 34 connect the abutting protrusions 31 and the support rods 15. Each adjusting panel 34 has two ends. The ends of the adjusting panel 34 are respectively connected pivotally to a corresponding one of the abutting protrusions 31 and a corresponding one of the support rods 15.

In the preferred embodiment, the peripheral sidewall of the base 30 has two shortened side surfaces and two elongated side surfaces. The shortened side surfaces of the base 30 are disposed opposite to each other. The elongated side surfaces of the base 30 are disposed opposite to each other. The base 30 further has a bottom surface, two hooking portions 32, and two hooked portions 33. The hooking portions 32 are respectively formed on and protrude from one of the shortened side surfaces of the base 30 and one of the elongated side surfaces of the base 30. Each hooking portion 32 has a hooking recess 321 formed through the hooking portion 32. The hooked portions 33 are respectively formed in the other shortened side surface of the base 30 and the other elongated side surface of the base 30. Each hooked portion 33 has a mounting recess 331, an inner top surface, and a hooking protrusion 332. The mounting recess 331 is formed in a corresponding one of the shortened side surfaces and one of the elongated side surfaces of the base 30 and is formed through the bottom surface of the base 30. The inner top surface of the hooked portion 33 is defined in the mounting recess 331. The hooking protrusion 332 is formed on and protrudes down from the inner top surface of the hooked portion 33.

Figure 4:
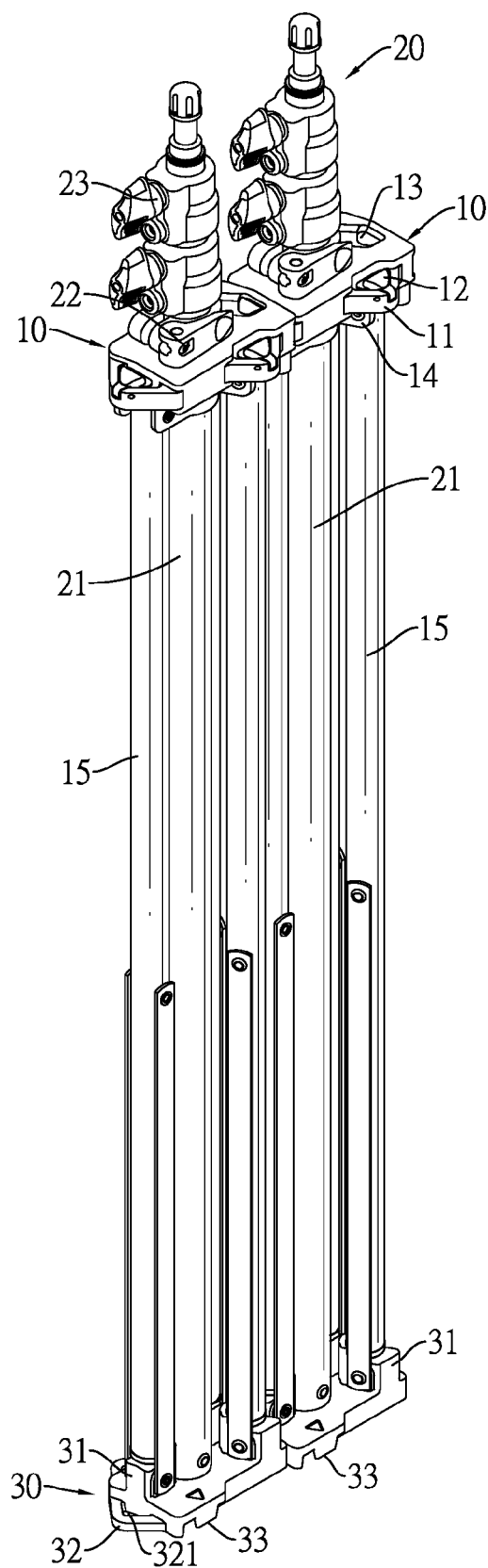
FIG. 4 is a first operational perspective view of the tripod in FIG. 1.
Figure 6:
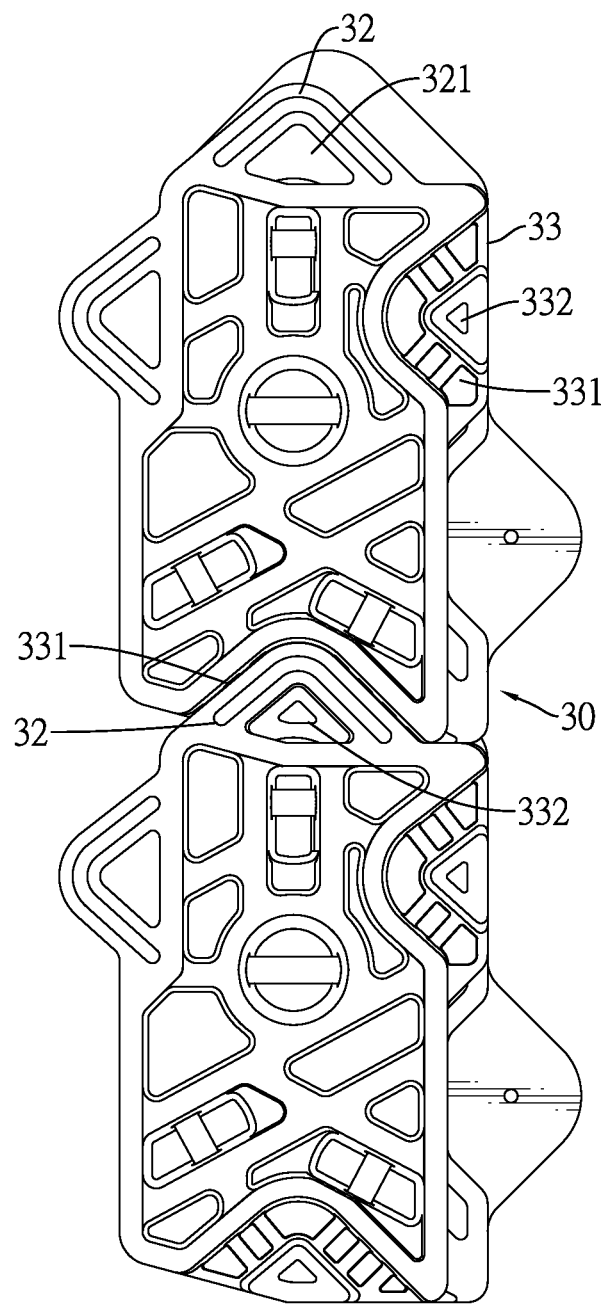
FIG. 6 is a first operational bottom view of the tripod in FIG. 1.

With reference to FIGS. 4 to 6, FIGS. 4 to 6 show a first means of storing multiple tripods of the present invention. Two of the tripods are defined respectively as a first tripod and a second tripod.

As shown in FIG. 5, the engaging protrusion 11 on the shortened sidewall of the mounting seat 10 of the first tripod is mounted through the engaging recess 13 on the shortened sidewall of the mounting seat 10 of the second tripod. During the combining of the first tripod and the second tripod, an inner sidewall in the engaging recess 13 of the second tripod presses against the engaging member 12 and the resilient element 123 of the first tripod to allow the engaging protrusion 11 and the engaging member 12 of the first tripod to protrude into the engaging recess 13 of the second tripod. As the engaging member 12 of the first tripod passes through the inner sidewall in the engaging recess 13 of the second tripod, the resilient element 123 of the first tripod pushes the engaging member 12 of the first tripod upward, such that the positioning protrusion 121 of the engaging member 12 of the first tripod engages in the engaging recess 13 of the second tripod.

As shown in FIG. 6, furthermore, the hooking portion 32 on the shortened side surface of the base 30 of the first tripod is connected to the hooked portion 33 on the shortened side surface of the base 30 of the second tripod. Specifically, the hooking protrusion 332 of the hooked portion 33 of the second tripod hooks in the hooking recess 321 of the hooking portion 32 of the first tripod.

Figure 7:
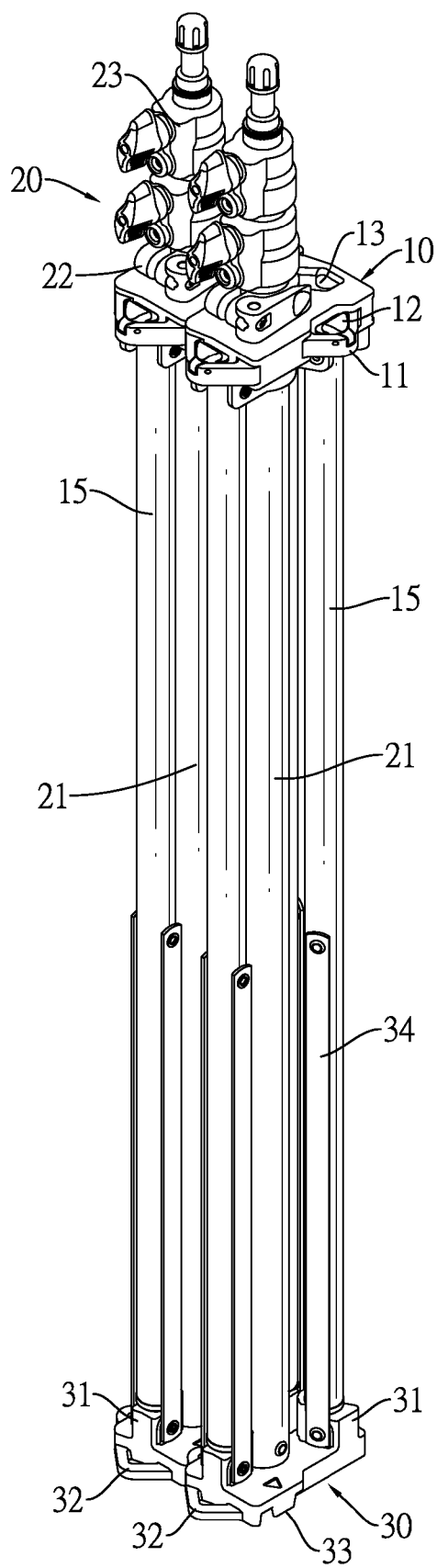
FIG. 7 is a second operational perspective view of the tripod in FIG. 1.
Figure 8:
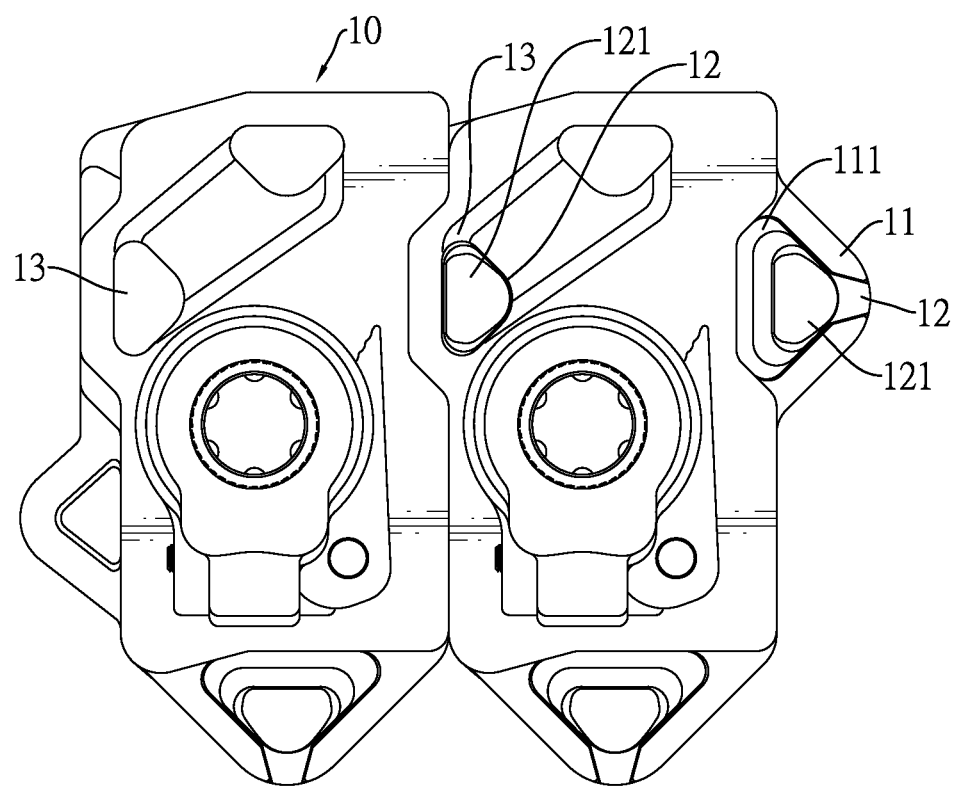
FIG. 8 is a second operational top view of the tripod in FIG. 1.
Figure 9:
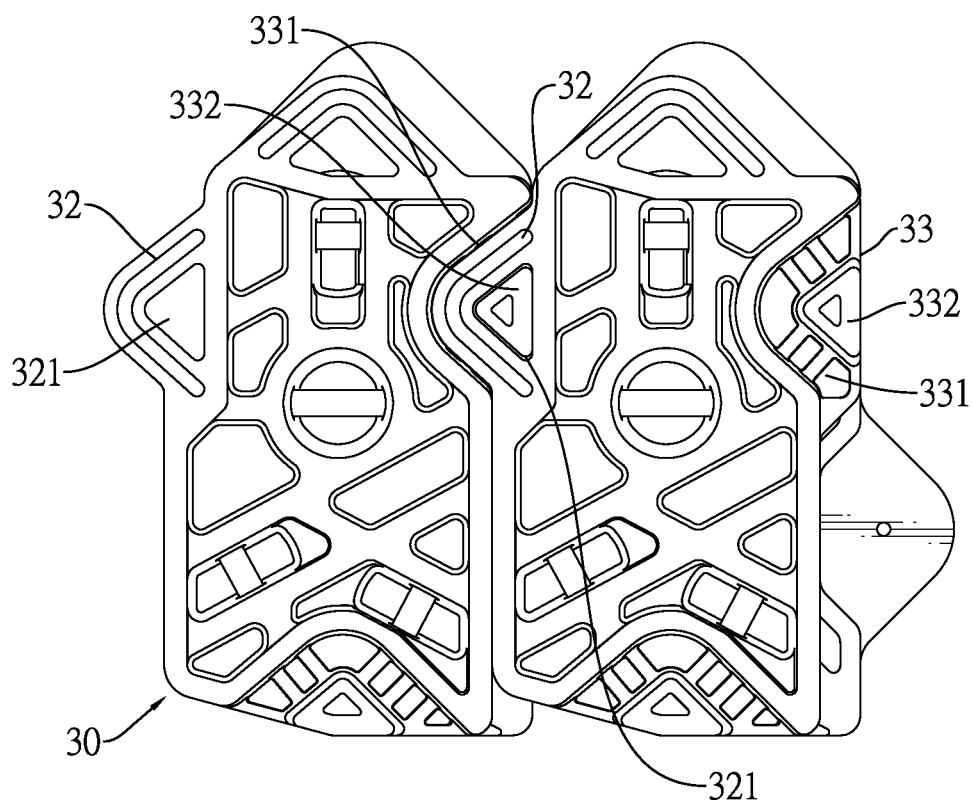
FIG. 9 is a second operational bottom view of the tripod in FIG. 1.

With reference to FIGS. 7 to 9, FIGS. 7 to 9 show a second means of storing multiple tripods of the present invention. Two of the tripods are defined respectively as a first tripod and a second tripod.

As shown in FIG. 8, the engaging protrusion 11 on the elongated sidewall of the mounting seat 10 of the first tripod is mounted through the engaging recess 13 on the elongated sidewall of the mounting seat 10 of the second tripod. During the combining of the first tripod and the second tripod, an inner sidewall in the engaging recess 13 of the second tripod presses against the engaging member 12 and the resilient element 123 of the first tripod to allow the engaging protrusion 11 and the engaging member 12 of the first tripod to protrude into the engaging recess 13 of the second tripod. As the engaging member 12 of the first tripod passes through the inner sidewall in the engaging recess 13 of the second tripod, the resilient element 123 of the first tripod pushes the engaging member 12 upward, such that the positioning protrusion 121 of the engaging member 12 of the first tripod engages in the engaging recess 13 of the second tripod.

As shown in FIG. 9, furthermore, the hooking portion 32 on the elongated side surface of the base 30 of the first tripod is connected to the hooked portion 33 on the elongated side surface of the base 30 of the second tripod. Specifically, the hooking protrusion 332 of the hooked portion 33 of the second tripod hooks in the hooking recess 321 of the hooking portion 32 of the first tripod.

Figure 10:
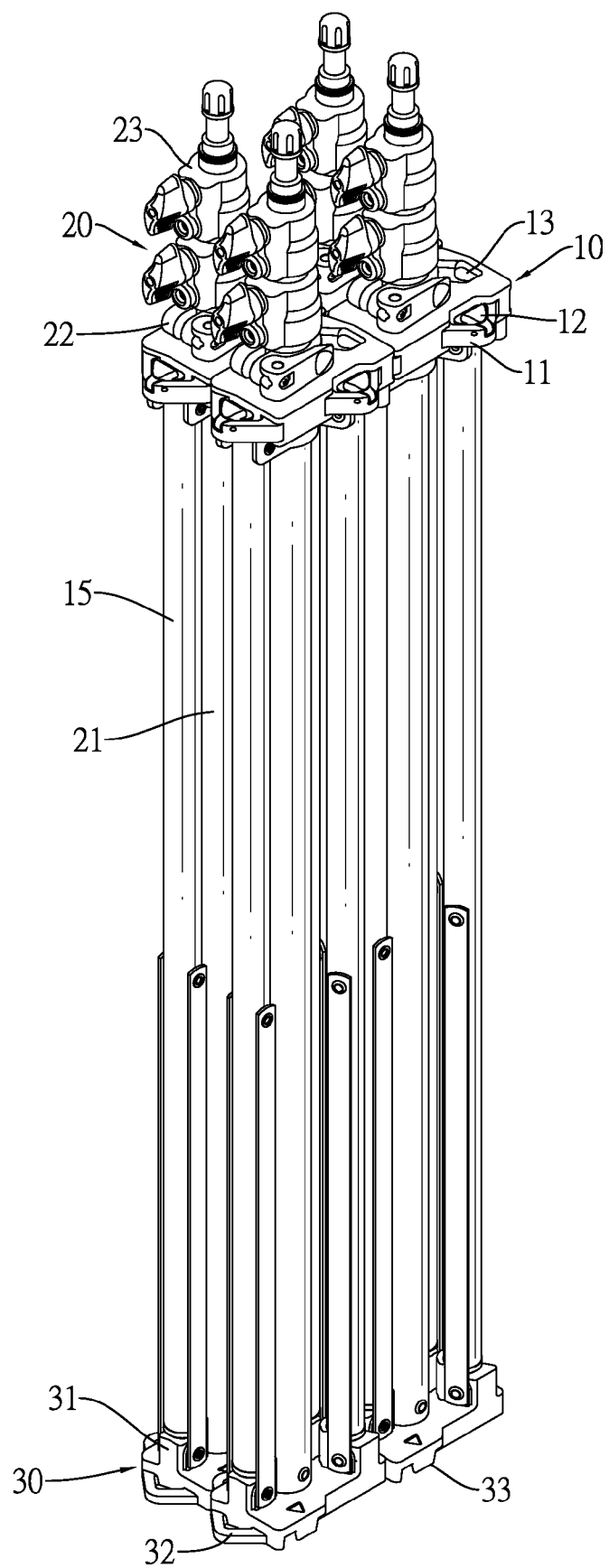
FIG. 10 is a third operational perspective view of the tripod in FIG. 1.

With reference to FIG. 10, FIG. 10 shows a third means of storing multiple tripods of the present invention. Four of the tripods are defined respectively as a first tripod, a second tripod, a third tripod, and a fourth tripod. The engaging protrusion 11 on the shortened and elongated sidewalls of the mounting seat 10 of the first tripod respectively engage in the engaging recesses 13 on the shortened sidewall of the second tripod and on the elongated sidewall of the third tripod. The engaging recesses 13 on the shortened and elongated sidewalls of the fourth tripod respectively engage with the engaging protrusions 11 on the shortened sidewall of the fourth tripod and on the elongated sidewall of the third tripod.

The tripod of the present invention has the following advantages. With the above-mentioned means of storing the tripods, the tripods can be arranged into a cuboid to reduce space that the tripods occupy. Thus, the tripods can be stored conveniently and easily. Moreover, since the tripods are stably connected to one another, the tripods do not topple when being bumped and can be moved easily.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A tripod with a storage structure comprising:
   a mounting seat having
      four sidewalls;
      a top surface;
      a bottom surface;
      two engaging protrusions respectively formed on two of the sidewalls of the mounting seat and disposed next to each other, and each engaging protrusion having
         an upper surface; and
         a receiving recess formed in the upper surface of the engaging protrusion;
      two engaging recesses respectively formed in the other two of the sidewalls of the mounting seat, disposed next to each other and formed through the top surface of the mounting seat;
      two engaging members respectively mounted in the receiving recesses, respectively connected pivotally to the engaging protrusions, and being resilient to pivot upward; and
      three support rods, each support rod having
         a lower end; and
         an upper end pivotally connected to the bottom surface of the mounting seat;
   a mounting assembly mounted on the mounting seat and having
      a retractable rod mounted through the mounting seat and having
         an upper end protruding up from the top surface of the mounting seat; and
         a lower end protruding down below the bottom surface of the mounting seat;
      a clamp ring mounted around the retractable rod and mounted on the top surface of the mounting seat; and
      a support mounted on the upper end of the retractable rod; and
   a base connected to the lower end of the retractable rod and having
      a top surface;
      a peripheral sidewall;
      three abutting protrusions separately formed on the top surface of the base, disposed adjacent to the peripheral sidewall of the base, and respectively abutting against the lower ends of the support rods; and
      multiple adjusting panels connecting the abutting protrusions and the support rods, each adjusting panel having two ends, the ends of the adjusting panel respectively connected pivotally to a corresponding one of the abutting protrusions and a corresponding one of the support rods.

2. The tripod as claimed in claim 1, wherein
   the four sidewalls of the mounting seat include
      two shortened sidewalls disposed opposite to each other; and
      two elongated sidewalls disposed opposite to each other;
   the engaging protrusions of the mounting seat are respectively formed on one of the shortened sidewalls of the mounting seat and one of the elongated sidewalls of the mounting seat, and each engaging protrusion further has
      two inner side surfaces defined in the receiving recess; and
      two pivot holes respectively formed through the inner side surfaces of the engaging protrusion and aligning with each other;
   the engaging recesses of the mounting seat are respectively formed in the other shortened sidewall of the mounting seat and the other elongated sidewall of the mounting seat;
   each engaging member of the mounting seat has
      a top;
      a bottom;
      a positioning protrusion formed on the top of the engaging member;
      a through hole formed through the engaging member and mounted between and aligning with the pivot holes of a corresponding one of the engaging protrusions; and
      a resilient element having two ends respectively abutting the bottom of the engaging member and the corresponding engaging protrusion; and
   the mounting seat further has two pivot rods respectively mounted through the pivot holes and the through holes that align with each other.

3. The tripod as claimed in claim 2, wherein
   the mounting seat further has three pairs of connecting panels separately formed on the bottom surface of the mounting seat; and
   the upper ends of the support rods are respectively connected pivotally to the three pairs of the connecting panels, and the upper end of each support rod is mounted between the connecting panels of a corresponding pair.

4. The tripod as claimed in claim 3, wherein
   the peripheral sidewall of the base has
      two shortened side surfaces disposed opposite to each other; and
      two elongated side surfaces disposed opposite to each other;
   the base further has
      a bottom surface;
      two hooking portions respectively formed on and protruding from one of the shortened side surfaces of the base and one of the elongated side surfaces of the base, and each hooking portion having a hooking recess formed through the hooking portion; and
      two hooked portions respectively formed in the other shortened side surface of the base and the other elongated side surface of the base, and each hooked portion having
         a mounting recess formed in a corresponding one of the shortened side surfaces and one of the elongated side surfaces of the base and formed through the bottom surface of the base;
         an inner top surface defined in the mounting recess; and
         a hooking protrusion formed on and protruding down from the inner top surface of the hooked portion.

5. The tripod as claimed in claim 2, wherein
   the peripheral sidewall of the base has
      two shortened side surfaces disposed opposite to each other; and
      two elongated side surfaces disposed opposite to each other;
   the base further has
      a bottom surface;
      two hooking portions respectively formed on and protruding from one of the shortened side surfaces of the base and one of the elongated side surfaces of the base, and each hooking portion having a hooking recess formed through the hooking portion; and two hooked portions respectively formed in the other shortened side surface of the base and the other elongated side surface of the base, and each hooked portion having a mounting recess formed in a corresponding one of the shortened side surfaces and one of the elongated side surfaces of the base and formed through the bottom surface of the base;

an inner top surface defined in the mounting recess; and a hooking protrusion formed on and protruding down from the inner top surface of the hooked portion.

6. The tripod as claimed in claim 1, wherein
the mounting seat further has three pairs of connecting panels separately formed on the bottom surface of the mounting seat; and the upper ends of the support rods are respectively connected pivotally to the three pairs of the connecting panels, and the upper end of each support rod is mounted between the connecting panels of a corresponding pair.

7. The tripod as claimed in claim 6, wherein
the peripheral sidewall of the base has two shortened side surfaces disposed opposite to each other; and two elongated side surfaces disposed opposite to each other;

the base further has a bottom surface;

two hooking portions respectively formed on and protruding from one of the shortened side surfaces of the base and one of the elongated side surfaces of the base, and each hooking portion having a hooking recess formed through the hooking portion; and two hooked portions respectively formed in the other shortened side surface of the base and the other elongated side surface of the base, and each hooked portion having a mounting recess formed in a corresponding one of the shortened side surfaces and one of the elongated side surfaces of the base and formed through the bottom surface of the base;

an inner top surface defined in the mounting recess; and a hooking protrusion formed on and protruding down from the inner top surface of the hooked portion.

8. The tripod as claimed in claim 1, wherein
the peripheral sidewall of the base has two shortened side surfaces disposed opposite to each other; and two elongated side surfaces disposed opposite to each other;

the base further has a bottom surface;

two hooking portions respectively formed on and protruding from one of the shortened side surfaces of the base and one of the elongated side surfaces of the base, and each hooking portion having a hooking recess formed through the hooking portion; and two hooked portions respectively formed in the other shortened side surface of the base and the other elongated side surface of the base, and each hooked portion having a mounting recess formed in a corresponding one of the shortened side surfaces and one of the elongated side surfaces of the base and formed through the bottom surface of the base;

an inner top surface defined in the mounting recess; and a hooking protrusion formed on and protruding down from the inner top surface of the hooked portion.

\* \* \* \* \*